United States Patent
Zhou et al.

(10) Patent No.: US 12,529,746 B2
(45) Date of Patent: Jan. 20, 2026

(54) METHOD AND SYSTEM FOR IMPROVED MAGNETIC RESONANCE IMAGING

(71) Applicant: THE BOARD OF TRUSTEES OF THE UNIVERSITY OF ILLINOIS, Urbana, IL (US)

(72) Inventors: Xiaohong Joe Zhou, Naperville, IL (US); Guangyu Dan, Chicago, IL (US); Kaibao Sun, Naperville, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 213 days.

(21) Appl. No.: 18/307,964

(22) Filed: Apr. 27, 2023

(65) Prior Publication Data

US 2024/0077563 A1    Mar. 7, 2024

Related U.S. Application Data

(60) Provisional application No. 63/336,079, filed on Apr. 28, 2022.

(51) Int. Cl.
*G01R 33/56* (2006.01)
*G01R 33/50* (2006.01)
*G01R 33/561* (2006.01)
*G01R 33/563* (2006.01)

(52) U.S. Cl.
CPC ....... *G01R 33/56341* (2013.01); *G01R 33/50* (2013.01); *G01R 33/5615* (2013.01); *G01R 33/56366* (2013.01)

(58) Field of Classification Search
CPC ............... G01R 33/5615; G01R 33/50; G01R 33/56341
See application file for complete search history.

(56) References Cited

U.S. PATENT DOCUMENTS

| | | | |
|---|---|---|---|
| 8,664,954 B2 | 3/2014 | Hetzer et al. | |
| 9,886,745 B2 | 2/2018 | Chen et al. | |
| 10,061,003 B2 * | 8/2018 | James | A61B 5/055 |
| 2019/0324102 A1 * | 10/2019 | Hernando | G01R 33/5608 |

FOREIGN PATENT DOCUMENTS

JP    2011516237 A    5/2011

OTHER PUBLICATIONS

Eichner, C., et al. (2020) "Increased sensitivity and signal-to-noise ratio in diffusion-weighted MRI using multi-echo acquisitions," Neuroimaging 221:117172.

Slator, P.J., et al. (2019) "Combined diffusion-relaxometry MRI to identify dysfunction in the human placenta," Magn. Reson. Med. 82(1):95-106.

Zhang, Y., et al. (2019) "STimulated Echo based Mapping (STEM) of T1, T2 and Apparent Diffusion Coefficient: Validation and Protocol Optimization," Magn. Reason. Med. 81:167-181.

* cited by examiner

*Primary Examiner* — Alesa Allgood
(74) *Attorney, Agent, or Firm* — Licata & Tyrrell P.C.; Jane Massey Licata

(57) ABSTRACT

Magnetic resonance imaging systems and methods are provided for time-efficiently producing a plurality of image contrasts, the plurality of image contrasts including a first contrast being coupled with a second contrast and acquired over a plurality of key parameters that govern the second contrast to which the first contrast is coupled. In addition, the plurality of image contrasts is used to simultaneously map the first contrast, the second contrast, and additional contrasts.

14 Claims, 10 Drawing Sheets

METHOD AND SYSTEM FOR IMPROVED MAGNETIC RESONANCE IMAGING

INTRODUCTION

This application claims the benefit of priority from U.S. Provisional Application Ser. No. 63/336,079, filed Apr. 28, 2022, the contents of which are incorporated herein by reference in their entireties.

This invention was made with government support under grant nos. R01EB026716 and 1S10RR028898 awarded by the National Institutes of Health. The government has certain rights in this invention.

BACKGROUND

Diffusion magnetic resonance imaging (MRI) is sensitive to tissue microstructures, while relaxation time is inherently related to the tissue biochemical composition. Joint analysis of diffusion MRI data acquired at different echo times (TEs) allows for characterization of the coupling between diffusion and spin-spin relaxation, which has been observed in a number of biological tissues. Such coupling can be exploited to extract unique tissue microstructural information for improved characterization of lesions, such as prostate cancer. In a method known as hybrid multidimensional imaging, diffusion-weighted images with multiple b-values and multiple TEs are successively acquired to study the interplay between diffusion and spin-spin relaxation time (T2), which typically requires multiple acquisitions at different TEs. This approach inevitably lengthens the scan times, leading to increased vulnerability to subject motion.

Several techniques have been proposed to address the limitations. For example, multi-readout echo-planar imaging (EPI) (i.e., EPI with multiple readout echo-trains) has been suggested to accelerate the data acquisition by acquiring multiple diffusion images with different TEs (Slator et al. (2019) *Magn. Reson. Med.* 82(1):95-106). This allows rapid quantification of apparent diffusion coefficient (ADC) and apparent spin-spin relaxation time (T2*), as opposed to separate data acquisitions in the existing ADC-T2 imaging techniques. With this approach, however, the overall echo-train becomes substantially lengthy as the number of TEs increases, which reduces the signal-to-noise ratio (SNR). Because of this problem, the spatial resolution of the images at each TE is often limited. Although parallel imaging can be used to shorten the echo-train length, practical considerations such as SNR and residual aliasing often constrain the under-sampling factor. Another approach to shortening the echo-train length is to employ segmented EPI acquisition (Eichner et al. (2020) *Neuroimaging* 221:117172). A downside of this approach, however, is the need for multiple shots to cover k-space, prolonging the scan and consequently discounting the inherent benefits of fast acquisition in multi-readout EPI.

Reduced field-of-view (rFOV) imaging provides an alternative strategy to reduce the echo-train length for EPI sequences, while maintaining high spatial resolution (Sun et al. (2022) *Magn. Reason. Med.* 87:2372-2379). The technique excites an rFOV by using a 2D radiofrequency (RF) pulse, followed by a set of short echo-trains to allow images with multiple TEs to be acquired in one shot.

In addition to studying the coupling between diffusion and relaxation times, quantitatively mapping of relaxation times and apparent diffusion coefficient (ADC) has also become increasingly important in clinical applications, such as synthetic multi-contrast imaging, tumor characterization, and cardiac imaging. Although simultaneous multi-parametric mapping can be accomplished using advanced techniques such as MR fingerprinting, clinical protocols typically rely on separate scans for mapping relaxation times and ADC, resulting in not only a long acquisition time but also image co-registration challenges when inter-scan motion is present. To improve data acquisition efficiency, a stimulated echo-based mapping (STEM) technique has been suggested (Zhang et al. (2019) *Magn. Reason. Med.* 81:167-181), which allows integrated T1, T2, and ADC mapping using a single sequence. To produce the multi-parametric maps, the sequence must step through multiple mixing times (TM), TE, and b-values in different repetition times (TRs). In addition, STEM does not include T2* mapping which can be important when studying iron content, blood oxygenation, and other tissue properties.

Accordingly, while multiple techniques for MRI have been described, additional systems and methods are needed to reduce scan times, improve patient compliance, and increase data reliability, particularly for studying the coupling phenomena between diffusion and relaxation times and simultaneous mapping of diffusion and relaxation parameters. The present invention meets this need.

SUMMARY OF THE INVENTION

This invention provides a magnetic resonance image (MRI) capture method including the steps of generating pulse sequence to produce a plurality of image contrasts, the plurality of image contrasts including at least a first contrast coupled with a second contrast; acquiring the plurality of image contrasts, wherein the plurality of image contrasts correspond to diffusion-weighted images, each diffusion-weighted image being acquired with a train of gradient echoes consistent with echo-planar imaging and at a specific effective echo time ($TE_{eff}$), where the $TE_{eff}$ is defined as the echo time (TE) when k-space center is sampled; capturing and producing at least one image. In one aspect, the first contrast is a diffusion-weighted contrast and the second contrast is a contrast weighted by spin-spin relaxation time (T2). In another aspect, the first contrast is a diffusion-weighted contrast and the second contrast is an apparent spin-spin relaxation time-weighted contrast (T2*-weighted contrast). In a further aspect, a plurality of TE or $TE_{eff}$ are generated by a train of radiofrequency (RF) refocusing pulses, each RF refocusing pulse producing a spin echo from which the train of gradient echoes are acquired. In yet another aspect, a plurality of TE or $TE_{eff}$ is produced by a plurality of trains of gradient echoes. In a further aspect, the plurality of trains of gradient echo are acquired at, or about, or immediately after the formation of a stimulated echo, wherein the plurality of image contrasts is optionally used for simultaneous parametric mapping of apparent diffusion coefficient, T1 relaxation time, T2* relaxation time, and/or T2 relaxation time. In an alternative aspect, the plurality of trains of gradient echoes are acquired at, about, or shortly after the formation of a spin echo. In another aspect, a gradient blip pulse is applied along a phase-encoding direction between adjacent echo trains to re-position the start point of the k-space trajectory for a next echo-train acquisition. In a further aspect, each gradient-echo train comprises a shortened train of echoes to produce an image over a reduced field-of-view. In another aspect, each gradient-echo train comprises a shortened train of echoes by employing parallel imaging, sparse k-space sampling, and/or segmented k-space acquisition. In still other aspects, the plurality of image contrasts is used in an intra-voxel incoherent motion (IVIM) diffusion model and extensions thereof. In some aspects, the plurality of image contrasts is optionally used to study coupling between diffusion and relaxation times in materials or biological tissues, thereby inferring material or tissue microstructures.

The present invention further provides a magnetic resonance imaging (MRI) system comprising an MRI device comprising an image contrast data acquisition component configured to produce a plurality of image contrasts, the plurality of image contrasts comprising a first contrast coupled with a second contrast; and an image processing component operably connected to the MRI device and configured to receive and process the plurality of image contrasts from the image contrast data acquisition component to produce an image.

DETAILED DESCRIPTION OF THE INVENTION

Figure 1:
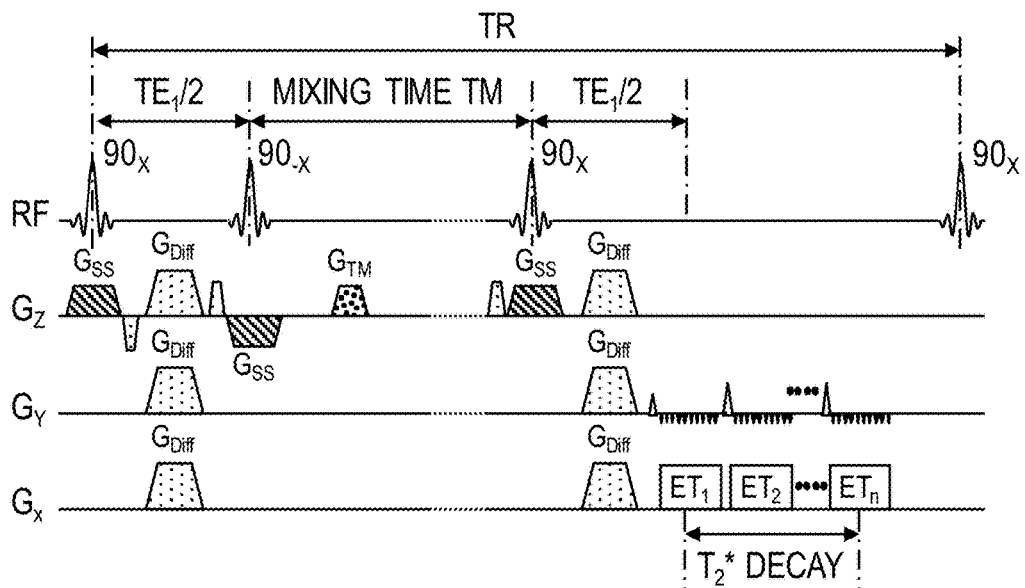
FIG. 1 shows a diagram of the stimulated multi-echo-train EPI sequence. This sequence is based on a diffusion-weighted stimulated echo and employs multiple EPI echo-train readouts at and after the peak of the stimulated echo. Each echo train corresponds to a different effective TE. A collection of the echo trains may be used to calculate T2*. $G_{ss}$, $G_{diff}$, $G_{TM}$ are the slice-selection, diffusion-weighting, and spoiling gradients, respectively. ET denotes echo train.

Among many coupled contrast parameters in MRI, the coupling between ADC and T2 (or T2*) relaxation time is of particular importance for its use in probing tissue microstructures and diagnosing cancer. In accordance with the present invention, time-efficient MRI pulse sequences and an associated MRI system are provided that facilitate efficient image processing to obtain ADC values at different TEs, as well as the generation of maps of relaxation times at different b-values. Systems and pulse sequences herein not only enable studies of contrast coupling within a clinically acceptable time, but also yield a set of images offering multiple contrasts.

For coupling between ADC and T2 (or T2*) relaxation time, diffusion-weighted images (DWI) at different TEs are acquired. A sequential acquisition approach with multiple scans leads to a lengthy scan time and increased sensitivity to subject motion. To address this, diffusion-weighted EPI is extended from a single gradient-echo train to multiple gradient-echo trains by utilizing a spin echo (FIG. 7), a train of spin echoes (FIG. 15), or a stimulated echo (FIG. 1), providing DWI data with different b-values and at different TEs without prolonging the scan times. In addition, an imaging technique was incorporated with reduced field-of-view to achieve an adequate spatial resolution without using a long echo-train length.

The methods and systems herein produce magnetic resonance images with multiple contrasts in a much reduced scan time via a suitable processing system connected either directly or indirectly to the MRI device. As demonstrated herein for brain and prostate tissue of healthy human subjects, T1, T2*, and ADC were quantitatively mapped using a single pulse sequence based on a diffusion-weighted stimulated echo sequence with multiple EPI readouts. As such, the method and system of this invention find use in clinical applications on human subjects as well as research investigations on laboratory animals. In addition, the coupling between diffusion and apparent spin-spin relaxation time (T2*) or between diffusion and spin-spin relaxation time (T2) can be studied in a time-efficient manner by acquiring multiple diffusion-weighted images at different TE or $TE_{eff}$ in a single shot.

In standard MR imaging the morphology of a large region of anatomy or an organ is imaged by using a pulse sequence that highlights contrast from one tissue type/organ to the next. To acquire a 3D image, data acquisition can be by acquisition of multiple, spatially adjoining, slices, or as a 3D dataset directly. In effect, a 2D slice is a map of signal level, the individual pixels of the map being the individual voxels. The signal level of each voxel depends on the contrast mechanism applied. The relative signal levels of each voxel then form the image. Though, in effect, this is a map of voxel brightness, when the intent is to depict morphologic variation directly across a region of the anatomy, it is called an image.

Alternatively, mapping is the creation of a display of an indirect quantity that affects the brightness of an MR signal. It is not a map of morphology, but of an inferred tissue characteristic, such as Apparent Diffusion Coefficient, or Fractional Anisotropy, or organ stiffness. As such, the brightness in the voxels that make up the mapped quantity also form an image but in common usage this would be called a map. Often such a map is compared to an image from the same anatomical region. This would allow, for instance, a tumor region that shows up bright on the brain in an image, to be compared to the diffusion coefficient in that region.

The terms imaging and mapping may be used interchangeably in the description herein and refer to a resulting dataset for display or manipulation not necessarily an attempted reproduction of an image of the morphology.

DWI, among other magnetic resonance imaging techniques, can provide invaluable information about the structure and function of various tissues in the body. In a diffusion-weighted pulse sequence, a pair of diffusion encoding gradients, or gradient waveforms, are applied along a direction to attenuate the transversal magnetization in a volume of tissue. The detected signal intensity depends on the diffusion of water. The "b-value" of a diffusion-weighted pulse sequence (measured in units of s/mm$^2$) indicates the degree of diffusion-weighting in an acquired image and dictates the level of signal attenuation as a function of water diffusivity in tissue. The b-value is determined in general by the strength and duration of the applied gradients and in some cases by the time interval between applied gradients. Higher b-values increase the effect of diffusion on the signal and decrease the overall signal intensity.

The multi-readout DWI technique described herein effectively uses a 2D RF pulse to limit the FOV in the phase-encoded direction, allowing a shorter readout echo-train to be used. A set of spatially co-reregistered diffusion images across multiple TEs can be acquired in one shot, providing an efficient way to obtain two-dimensional DWI data of tissue with different b-values and TEs, producing corresponding ADC and T2* maps, respectively. Acquisition time can be also reduced by placing multiple spin echo-trains after the initial diffusion preparation and spin echo readout echo-trains, which captures the information of diffusion and T2 relaxation.

The systems and methods of this invention find application in the diagnosis and treatment of a number of conditions including acute brain ischemia, brain tumors, white matter diseases, pediatric brain development and aging, oncological applications (brain, head and neck, breast, prostate, liver, hepatobiliary and pancreatic cancers), bowel disorders, genito-urinary applications, peripheral nerve imaging, cardiac imaging, and musculoskeletal applications. In particular, the systems and methods of this invention find application in the study of the coupling between diffusion and T2 relaxation time. The invention is described in greater detail by the following non-limiting examples.

Stimulated Multi-Echo-Train EPI Sequence with Diffusion-Weighting for Simultaneous, Co-Registered T1, T2* and ADC Mapping Stimulated multi-echo-train EPI sequence (FIG. 1) is based on a diffusion-weighted (DW) stimulated echo and employs multiple EPI echo-train readouts at and after the peak of the stimulated echo. Each echo train corresponds to a different effective TE during the T2*-decay process, where effective TE is defined as the TE when k-space center is sampled. A collection of these echo trains (e.g., 3) was used to estimate T2* values. To ensure that k-space was traversed repeatedly across the different EPI readout trains, a large phase-encoding gradient blip was placed in-between two adjacent readout trains to reset the k-space start point. In addition to T2* mapping, the stimulated multi-echo-train EPI sequence is also capable of producing T1, T2, and ADC maps by varying TM, TE1, and b-values, respectively, as shown in FIG. 1.

The DW stimulated multi-echo-EPI sequence was implemented on a GE MR750 3T scanner and used to image the brain and prostate of healthy human subjects. For the brain, axial images were acquired using an 8-channel head coil with the following parameters: TR=4000 ms, TM=[100, 300, 600] ms, TE=[47.0, 70.8, 94.6] ms, b-value$_{NEX}$=[$0_2$, $500_4$, and $1000_8$] s/mm$^2$ (where the subscripts indicate the number of signal averages for the corresponding b-value), diffusion gradient direction=right/left, FOV=180×180 mm$^2$, slice thickness=4 mm, matrix size=128×128, acceleration factor=2, and scan time=2 min and 48 s. For the prostate, a 32-channel cardiac coil was employed with the similar parameters to those in the brain scan except for: TM=[100, 300, 500] ms, TE=[45.0, 63.2, 81.4] ms, b-value$_{NEX}$=[$0_8$, $300_8$ and $750_8$] s/mm$^2$, FOV=180×135 mm$^2$, matrix size=128×96, and scan time=4 min and 48 s.

The signal (S) from the DW stimulated multi-echo-train EPI sequence in FIG. 1 can be expressed as:

$$S = S_0\left(1 - e^{-\frac{TR-TM-TE_1/2}{T1}}\right) e^{-\frac{TM}{T1}} e^{-\frac{TE-TE_1}{T2^*}} e^{-bADC} \quad \text{[Equation 1]}$$

where $S_0$ is the maximal signal intensity without T1, T2*, and diffusion weightings, and TE is defined as the effective echo time for a given echo-train acquisition. T1, T2*, and ADC maps were estimated individually by using an iterative Levenberg-Marquardt non-linear fitting algorithm voxel-by-voxel. Regions of interest (ROIs) were placed in the frontal gray matter (GM) and white matters (WM) of the brain, and the peripheral and transitional zones in the prostate. The mean parameter values and standard deviations within each ROI were evaluated and compared with the literature values.

Figures 2, 3:
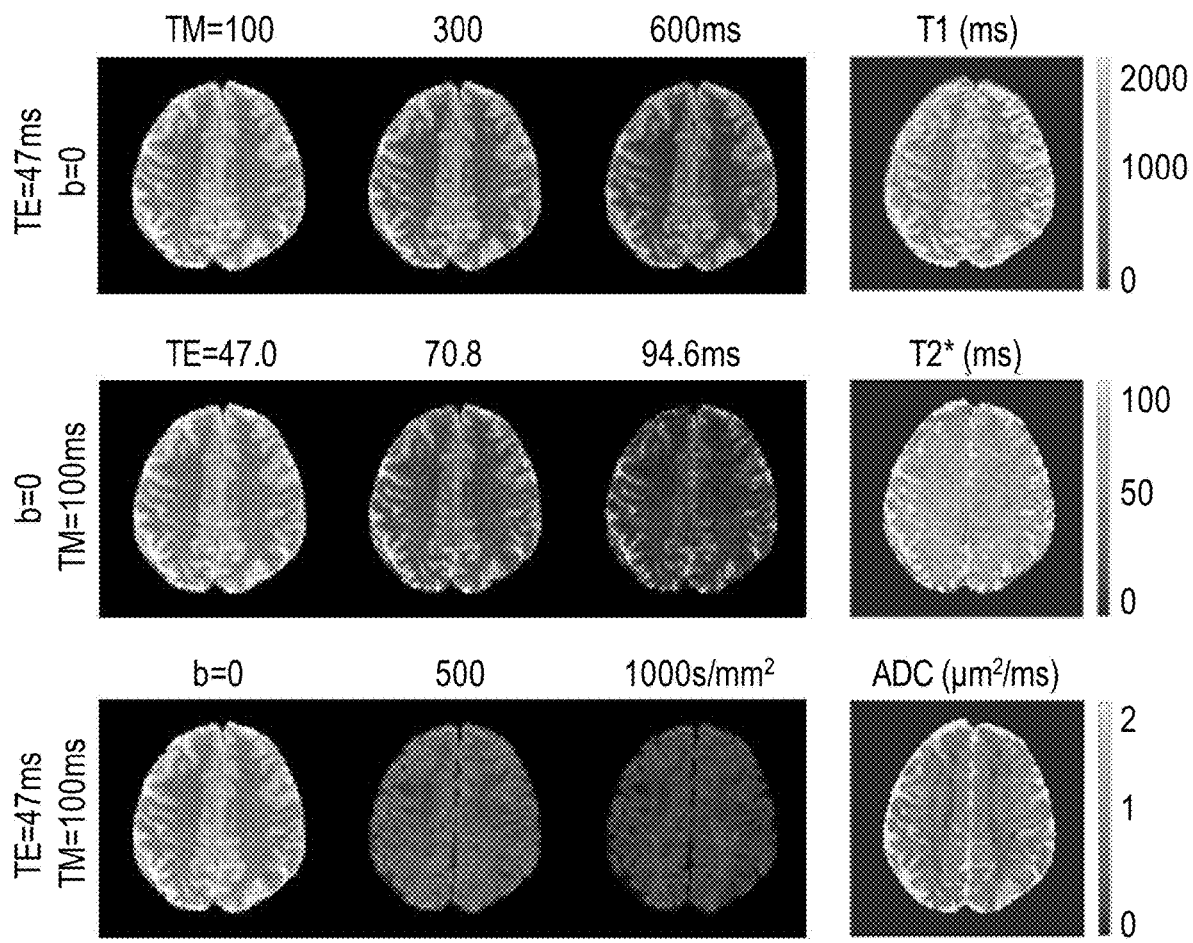
FIG. 2 shows brain images acquired with the stimulated multi-echo-train EPI sequence in FIG. 1 from a healthy subject using three TMs (first row), three TEs (second row), and three b-values (last row).
FIG. 3 shows T1, T2*, and ADC maps obtained from the corresponding row of images in FIG. 2. The numerical scales are shown on the right with the units indicated on top of each map.
Figures 4, 5:
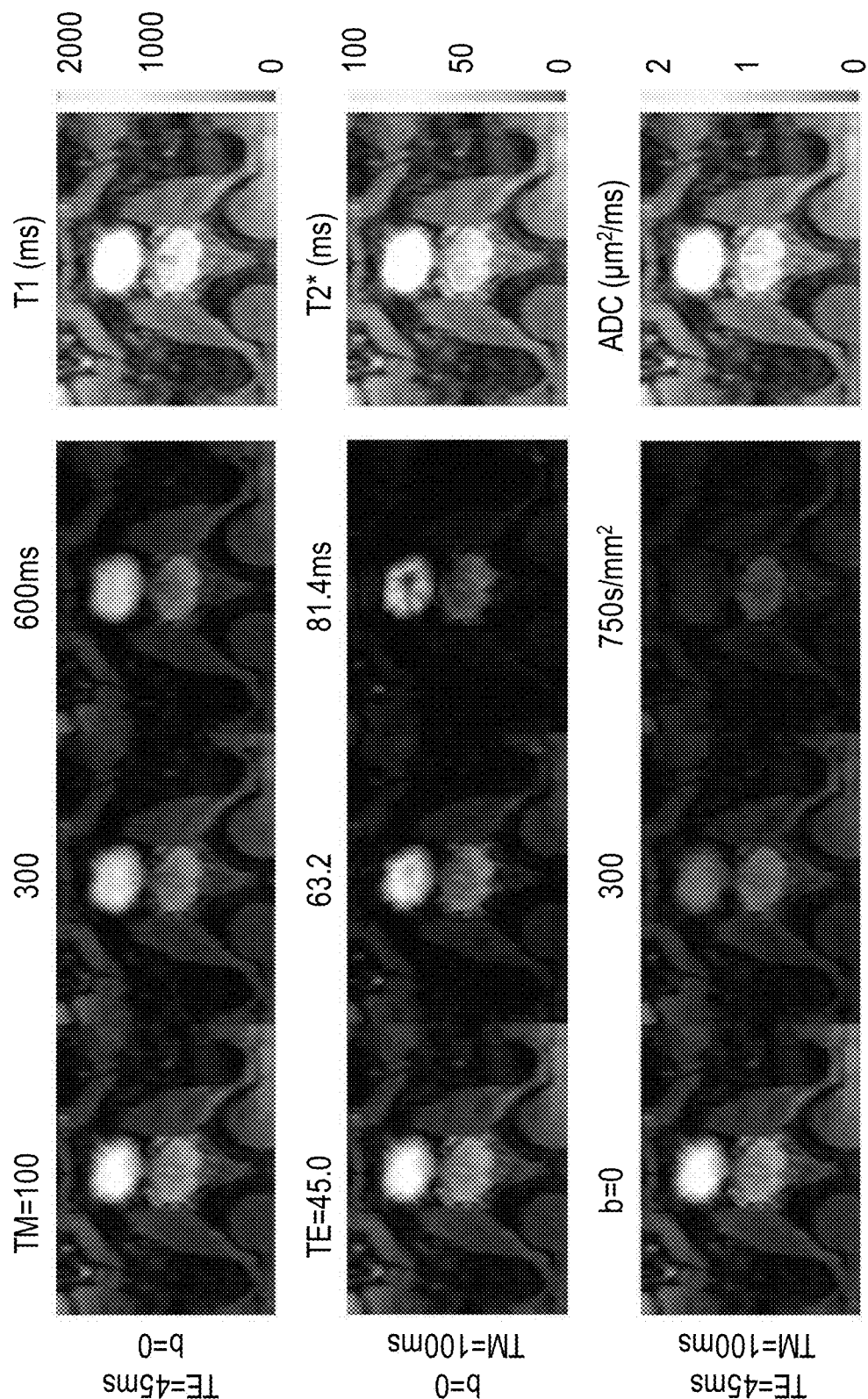
FIG. 4 shows prostate images acquired with the stimulated multi-echo-train EPI sequence in FIG. 1 from a healthy subject using three TMs (first row), three TEs (second row), and three b-values (last row).
FIG. 5 shows T1, T2*, and ADC maps obtained from the corresponding row of images in FIG. 4. The numerical scales are shown on the right with the units indicated on top of each map.

FIG. 2 shows brain images acquired at different TMs, TEs, and b-values with good image quality. The T1, T2*, and ADC maps (FIG. 3) exhibited the expected image contrasts. The prostate images and the resulting T1, T2*, and ADC maps in FIG. 4 and FIG. 5 showed similar results. Tables 1 and 2 list the ROI-averaged values of T1, T2*, and ADC in the different brain and prostate regions, respectively.

TABLE 1

| Brain Tissue | T1 (ms)[1] | T2* (ms)[2] | ADC (μm$^2$/ms)[3] |
|---|---|---|---|
| Gray Matter | 1313.6 ± 222.7 | 58.8 ± 12.0 | 0.78 ± 0.14 |
| White Matter | 829.8 ± 82.7 | 54.7 ± 6.9 | 0.68 ± 0.09 |

[1]Mean and standard deviation of T1 (estimated at b = 0, TE = 47 ms).
[2]Mean and standard deviation of T2* (estimated at b = 0, TM = 100 ms).
[3]Mean and standard deviation of ADC (estimated at TE = 47 ms, TM = 100 ms).

TABLE 2

| Prostate Tissue | T1 (ms)[1] | T2* (ms)[2] | ADC (μm$^2$/ms)[3] |
|---|---|---|---|
| Peripheral Zone | 1572.5 ± 309.2 | 63.4 ± 13.0 | 1.21 ± 0.11 |
| Transitional Zone | 1235.9 ± 167.5 | 50.2 ± 9.5 | 1.03 ± 0.12 |

[1]Mean and standard deviation of T1 (estimated at b = 0, TE = 47 ms).
[2]Mean and standard deviation of T2* (estimated at b = 0, TM = 100 ms).
[3]Mean and standard deviation of ADC (estimated at TE = 45 ms, TM = 100 ms).

For the brain (Table 1), the gray matter yielded higher T1, T2* and ADC values than the white matter (1313.6 vs. 829.8 ms, 58.8 vs. 54.7 ms, 0.78 vs. 0.68 μm$^2$/ms, respectively). For the prostate (Table 2), T1, T2*, and ADC values in the peripheral zone (1572.5 ms, 63.4 ms, and 1.21 μm$^2$/ms) were larger than in the transitional zone (1235.9 ms, 50.2 ms, and 1.03 μm$^2$/ms).

Based upon these results, the present invention provides a stimulated multi-echo-train EPI sequence for simultaneous T1, T2*, and ADC mapping. This method expands the capability of the STEM technique known in the art. The T1 and ADC values in the brain, and T1, T2*, and ADC values in the prostate are consistent with that described in the prior art. The T2* values of the brain tissue obtained in this study were slightly higher than what have been previously reported (54.7 ms vs. 44.7 ms in WM, 58.8 ms vs. 51.8 ms in GM). However, this difference was likely related to different measurement sequences (i.e., EPI vs. gradient echo). However, the difference is not expected to hinder clinical applications, especially for longitudinal studies using the same measurement sequence.

Multi-Readout Diffusion-Weighted Imaging with a Reduced FOV for Studying the Coupling Between Diffusion and T2* Relaxation This invention also provides a time-efficient pulse sequence, termed multi-readout diffusion-weighted imaging (DWI), that combines rFOV excitation and multi-readout EPI acquisition and investigates coupling between diffusion and T2* relaxation. Diffusion-weighted signals at multiple TEs are acquired following a single excitation for improved time efficiency. The acquisitions are repeated with different b-values, and the entire dataset with both TE and b-value as variables are used for simultaneous ADC and T2* mapping to reveal diffusion-relaxation coupling.

Coupling between diffusion and T2* relaxation can occur in heterogenous tissues where MR signal can be modeled as unmixed pools of water in two or more tissue components. Consider a specific tissue with two components having different diffusion properties and T2* relaxation times. The signal intensity S(TE, b) with contributions from both components can be expressed as:

$$S(TE, b)/S_0 = f_1 \exp(-TE/T2^*_1)\exp(-ADC_1 \times b) + f_2 \exp(-TE/T2^*_2)\exp(-ADC_2 \times b) \quad \text{[Equation 2]}$$

where $f_1$ and $f_2$ are the volume fractions of the two components, each with its own ADC and T2* values as indicated by the subscripts; and $S_0$ is the signal intensity when TE=0 ms and b-value=0 s/mm². Voxel-wise ADC at a given TE can be calculated by:

$$ADC(TE)=-\ln(S(TE, b_2)/S(TE, b_1))/(b_2-b_1) \qquad \text{[Equation 3]}$$

Similarly, voxel-wise T2* values at a given b-value can be obtained from:

$$T2^*(b)=-(TE_2-TE_1)/\ln(S(TE_2, b)/S(TE_1, b)) \qquad \text{[Equation 4]}$$

To investigate coupling between ADC(TE) and T2*(b), functional monotonicity was analyzed by taking the derivatives of Eqs. [3] and [4], respectively. As shown illustrated graphically in FIG. 6, the interplay between diffusion and T2* relaxation can be assessed by the sign of the following expression:

$$(ADC_1-ADC_2)\times(T2^*_1-T2^*_2) \qquad \text{[Equation 5]}$$

Figure 6:
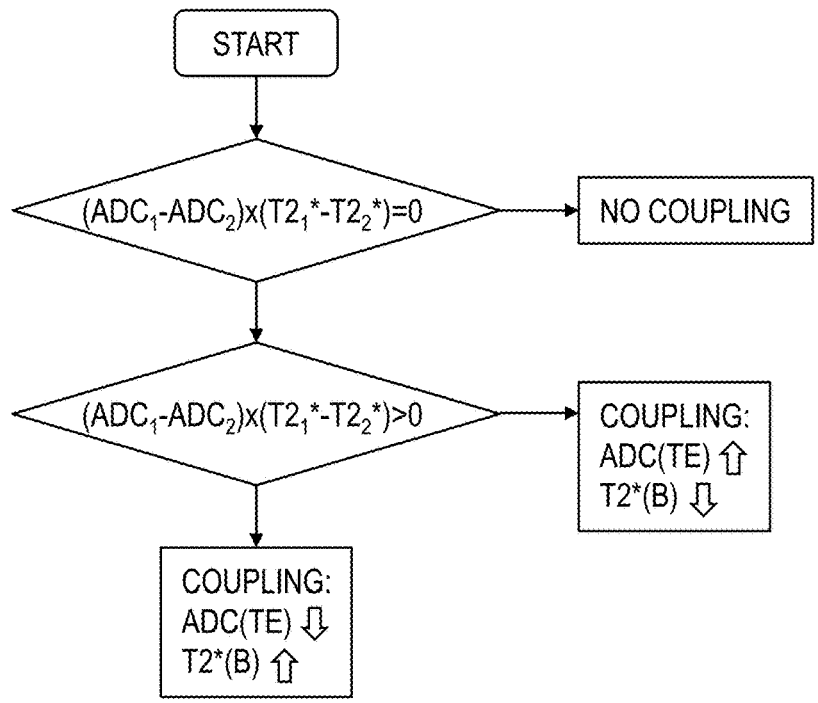
FIG. 6 is a flow chart for determining the coupling between diffusion and T2* relaxation. The coupling phenomenon exists when the two tissue compositions have different ADC and T2* (i.e., $(ADC_1-ADC_2) \times (T2^*_1 - T2^*_2) \neq 0$). If $(ADC_1-ADC_2) \times (T2^*_1 - T2^*_2) > 0$, ADC monotonically increases with TE (up arrow), while T2* monotonically decreasing with b-value (down arrow). Conversely, if $(ADC_1-ADC_2) \times (T2^*_1 - T2^*_2) < 0$, ADC monotonically decreases with TE (down arrow), while T2* monotonically increasing with b-value (up arrow).

As detailed in the caption of FIG. 6, when $(ADC_1-ADC_2)\times(T2^*_1-T2^*_2)>0$, ADC(TE) monotonically increases with TE, while T2*(b) monotonically decreasing with b-value. Conversely, when $(ADC_1-ADC_2)\times(T2^*_1-T2^*_2)<0$, opposite trends will be observed.

Although the above descriptions assumed two b-values or two TEs, similar results can be generalized to more b-values and/or TEs. In that case, ADC(TE) and/or T2*(b) can be obtained via a least-squares regression.

Figure 7:
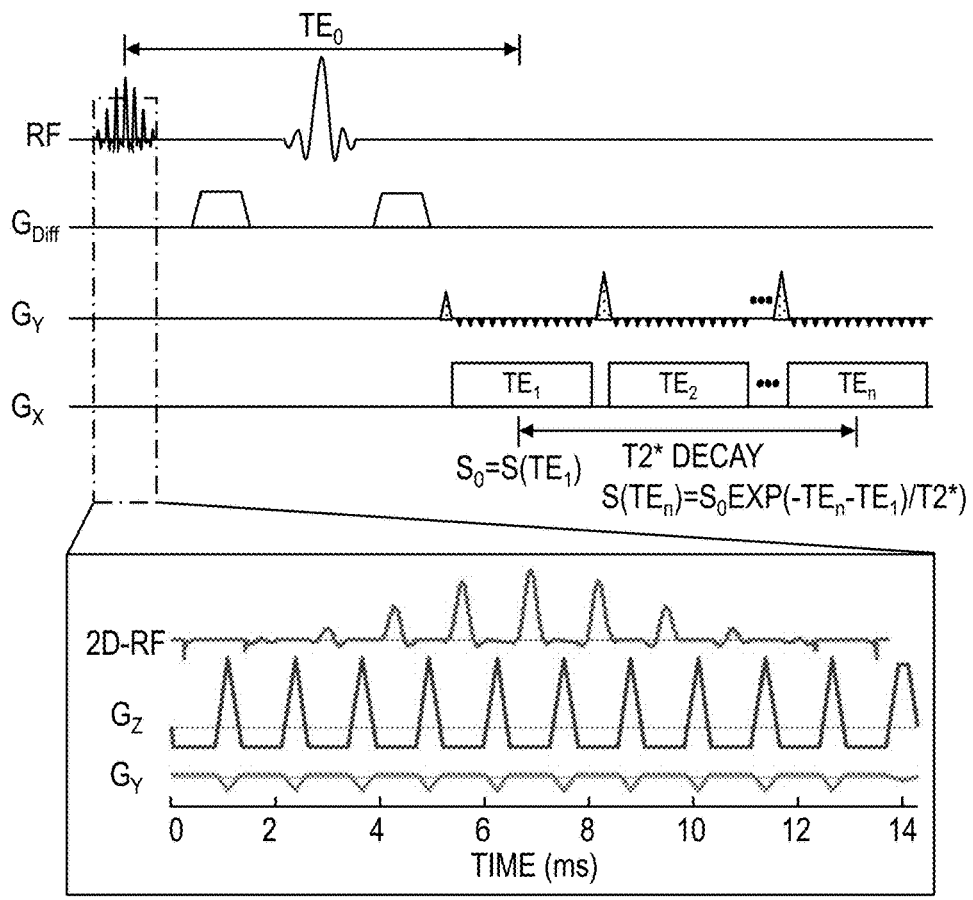
FIG. 7 shows a diagram of the multi-readout DWI sequence. Multiple EPI echo-trains (or readout trains) are incorporated into the sequence, with each echo-train corresponding to a specific effective TE (upper panel). In the multi-readout DWI sequence, a 2D RF pulse is used to restrict the FOV so that the length of each echo-train (TE) can be reduced, allowing multiple echo-trains to be acquired in one shot within the T2-decay window (lower panel).

Pulse Sequence Design. The multi-readout DWI sequence was built upon a spin-echo diffusion-weighted EPI sequence in which multiple (e.g., 3) EPI readout echo-trains were placed after a Stejskal-Tanner diffusion preparation module (FIG. 7, upper panel). Each EPI readout echo-train corresponds to a distinct effective TE value, with the first echo-train coincided with the nominal TE ($TE_1$) associated with the peak of the spin echo. Pre-phasing gradients (shaded) along the phase-encoded direction were applied prior to each readout train, followed by the phase-encoding blips. Notably, starting from the second readout train, the area of the pre-phasing gradient $A_{g,m}$, (m=2, 3, . . . M), differed from that of the initial pre-phasing gradient $A_{g,1}$ because $A_{g,m}$ needed to cancel all phase accumulations from the preceding phase-encoding blips so that the initial value of $A_{g,1}$ can be carried over across all readouts for consistent k-space positioning. $A_{g,m}$ was determined by:

$$A_{g,m}=-(N-1)\cdot A_b \qquad \text{[Equation 6]}$$

where N is the number of k-space lines acquired in each readout train, and $A_b$ is the area of each phase-encoding gradient blip.

To maintain the spatial resolution while reducing the duration of each echo-train so that multiple echo-trains can be acquired, a 2D RF pulse (FIG. 7, lower panel) was used to limit the FOV. The 2D RF pulse was designed by employing a fly-back EPI-like excitation k-space trajectory to avoid Nyquist ghosts. Eleven sub-pulses with a time-bandwidth product (TBP) of 3.01 were modulated by an envelope pulse whose TBP was 3.53 and pulse width was 14.7 ms. Both the sub-pulses and the envelope pulse were designed using a Shinnar-Le-Roux algorithm with a linear phase. A tilted excitation k-space design was used to enable multi-slice imaging, together with a subsequent refocusing RF pulse on the water signal to achieve fat suppression.

The multi-readout DWI sequence was implemented and evaluated on a GE MR750 3T scanner (GE Healthcare, Waukesha, Wisconsin) with a maximum gradient strength of 50 mT/m and a maximum slew rate of 200 T/m/s. Experiments on the prostates of six healthy male human subjects (age=31.7±6.9 years) and a patient with confirmed prostate cancer were performed using a 32-channel phased-array coil. Participants provided written informed consent according to a protocol approved by the Institutional Review Board. High order shimming was applied prior to the diffusion imaging sequences to improve the field homogeneity and hence mitigate the geometric distortion. The acquisition parameters of multi-readout DWI were: TR=4000 ms, number of echo-trains=3, length of each echo train=24, TEs=63/78.8/94.6 ms, FOV=180×90 mm², imaging matrix=74×32, partial Fourier factor=6/8, zero-filled reconstruction matrix=128×64, number of slices=18, slice thickness=3 mm, slice spacing=1 mm, and $b_{NEX}=0_6/500_6/1000_6$ s/mm². For each non-zero b-value, the diffusion gradient was applied successively along the three orthogonal directions to obtain a trace-weighted image to mitigate the effects of diffusion anisotropy. The total acquisition time was 3 min and 40 s. For comparison, conventional diffusion-weighted images using a spin-echo EPI sequence were also acquired on a representative subject. Acquisitions were repeated with different TEs using the same parameters as in the multi-readout DWI acquisitions, except that partial Fourier sampling was not employed and the scan time was 10 min and 52 s.

Image Reconstruction and Data Analysis. Diffusion-weighted images acquired at three b-values and three TEs were individually reconstructed. Quantitative measurement of the SNR was performed on the image with the highest b-value (i.e., 1000 s/mm²) and the maximum TE (i.e., 94.6 ms), where the signals were maximally attenuated to assess the worst-case scenario. The SNR was calculated by using signal intensity in the whole prostate gland divided by the average of background standard deviations over four regions (each with an area of about 100 mm²) at the corners of the image.

The images from the first echo-train corresponded to conventional spin-echo diffusion-weighted images. The images from the subsequent echo-trains were subject to T2* weighting as described by:

$$S(TE_n)/S(TE_1)=\exp(-(TE_n-TE_1)/T2^*) \qquad \text{[Equation 7]}$$

where n is the echo-train index (i.e., 1, 2, 3, etc.). All images with different b-values and TEs were analyzed using custom MATLAB (The MathWorks, Inc., Natick, MA) programs. Voxel-wise T2* values at each b-value were calculated from signals acquired with the three TEs. Similarly, voxel-wise ADCs were computed for each TE from signals acquired with the three b-values. Both T2* and ADC mapping were performed with mono-exponential fitting using the corresponding equations.

Figure 8:
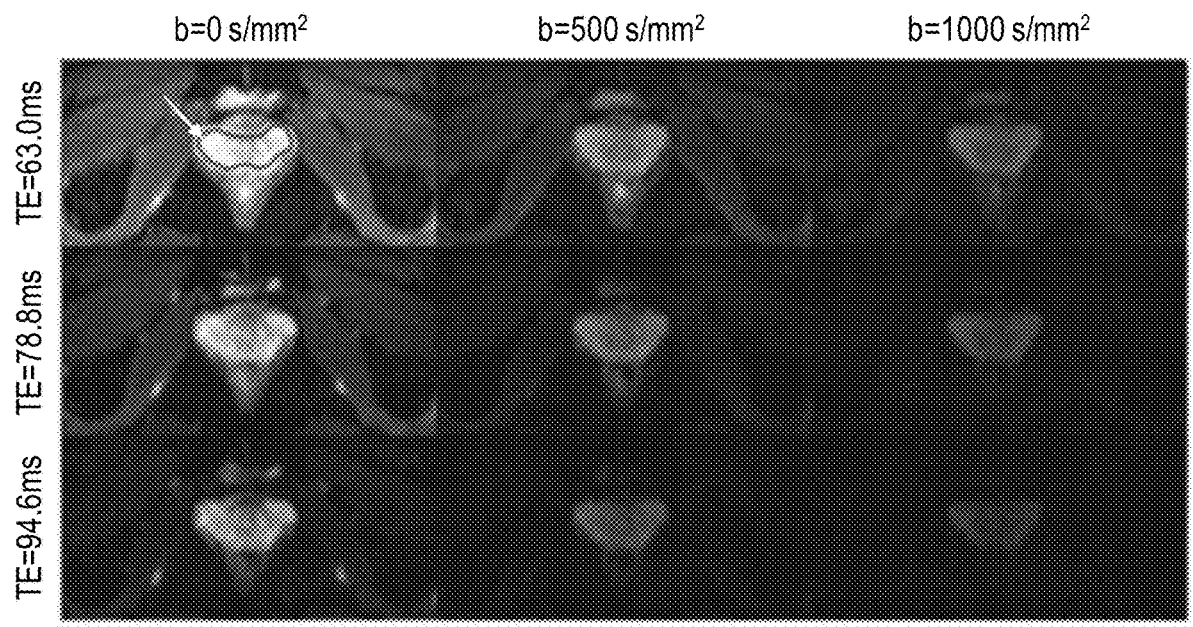
FIG. 8 shows a set of diffusion-weighted images of the prostate acquired from a representative healthy subject (35 years of age) using the multi-readout DWI sequence shown in FIG. 7 with three b-values and three TEs. The resulting nine images are displayed in a two-dimensional grid. For SNR calculations, a region of interest (ROI) was drawn on the T2-weighted image (b=0 s/mm$^2$, TE=63.0 ms), as indicated by the contour line (arrow). Although multiple axial slices were acquired, only the central slices of the prostate are shown.

For each participant, regions of interest (ROIs) were drawn on the T2-weighted images (b=0 s/mm², TE=63 ms) in the middle slice of the prostate to minimize the partial volume effects (see FIG. 8). The ROI selections were performed under the guidance of two radiologists, each having more than ten years of experience. After obtaining the voxel-wise parameter maps, the mean values of ADC and T2* within the ROIs were calculated for each participant and used for comparisons among different b-values and TEs. A Friedman test was used to evaluate the significance of variations in ADC as a function of TE and in T2* as a function of b-value. A P-value of <0.05 was used as a threshold for statistical significance.

Figure 9:
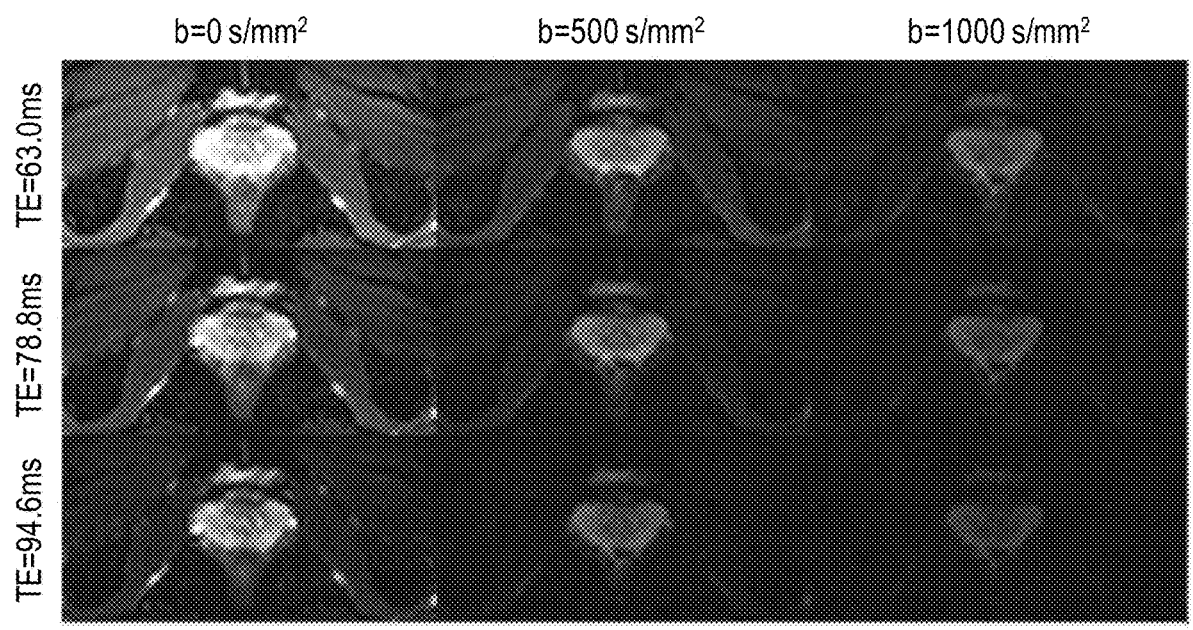
FIG. 9 shows a set of diffusion-weighted images of the prostate acquired from the same subject as in FIG. 8 using a conventional spin-echo diffusion-weighted EPI sequence in nine separate scans with three b-values and three TEs. The resulting nine images are displayed similarly as in FIG. 8.

FIG. 8 and FIG. 9 display a set of diffusion-weighted prostate images from a healthy subject (35 years of age) that were acquired using the multi-readout DWI sequence and the conventional spin-echo DWI sequence, respectively. For each sequence, nine diffusion-weighted images are shown in a two-dimensional grid (horizontal direction: b-values; vertical direction: TEs), corresponding to the three b-values and three TEs used in the acquisition. Compared to the conventional DWI sequence, the multi-readout DWI sequence realized an acceleration factor of 3 without compromising the spatial resolution. Using the image with the highest b-value of 1000 s/mm² and the longest TE of 94.6 ms (i.e., the least favorable condition for SNR), quantitative comparison of SNR in the whole prostate gland revealed similar values of 25.9 and 26.9 for the conventional and multi-readout DWI pulse sequences, respectively.

Figure 10:
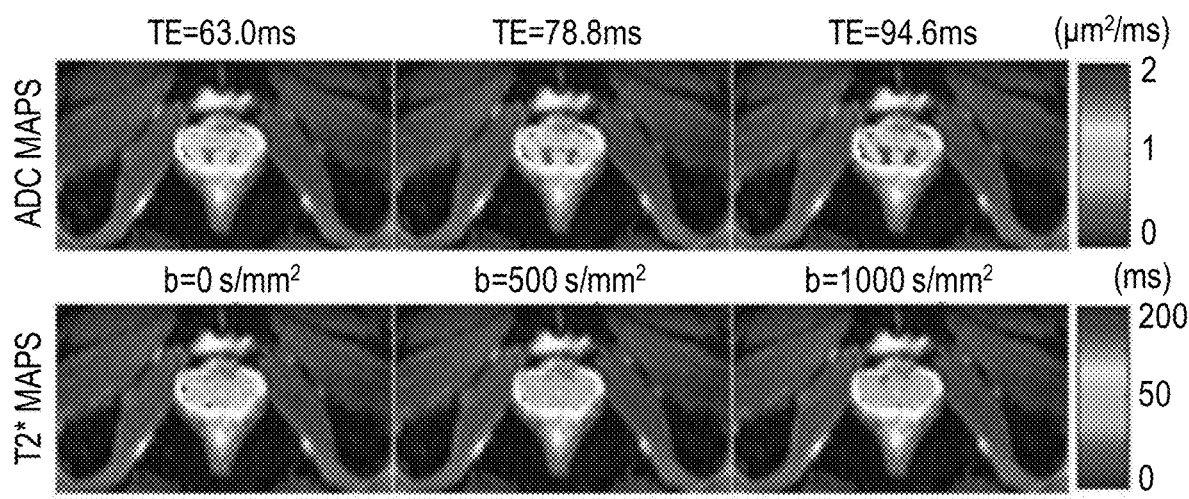
FIG. 10 shows maps of ADC and T2* obtained from the multi-readout DWI sequence on the healthy prostate. ADC maps at different TEs (63 ms, 78.8 ms, and 94.6 ms) and T2* maps at different b-values (0 s/mm$^2$, 500 s/mm$^2$, and 1000 s/mm$^2$) are overlaid on the T2-weighted image with b-value=0 s/mm$^2$ and TE=63 ms. The ADC values (1.28 µm$^2$/ms, 1.33 µm$^2$/ms, and 1.40 µm$^2$/ms) increased with TE, but the T2* values (60.12 ms, 52.90 ms, and 51.02 ms) decreased as b-value increased.
Figure 11:
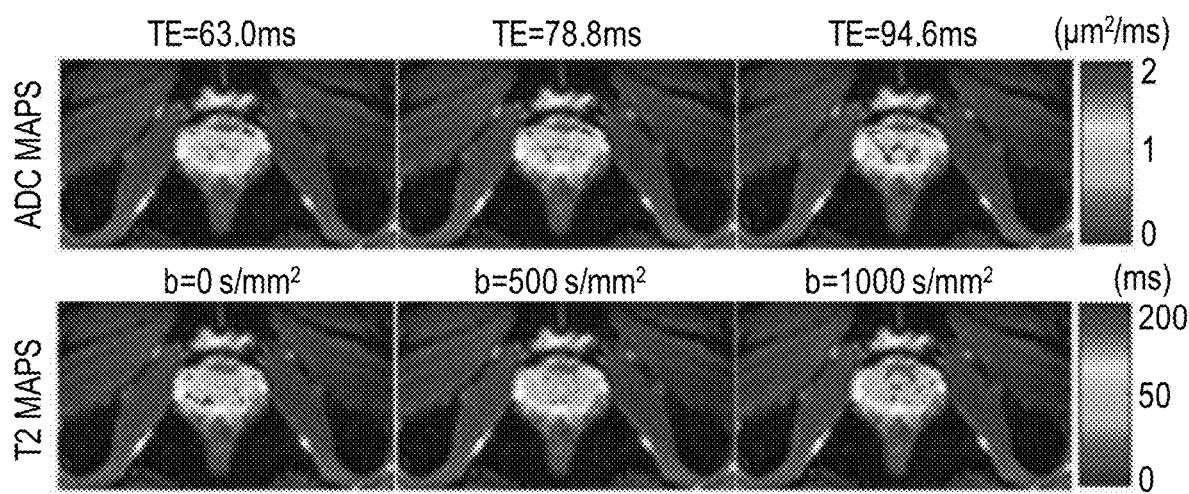
FIG. 11 shows maps of ADC and T2 obtained from the conventional DWI sequence on the same subject as in FIG. 10. ADC maps of the prostate at different TEs (63 ms, 78.8 ms, and 94.6 ms) and T2 maps at different b-values (0 s/mm$^2$, 500 s/mm$^2$, and 1000 s/mm$^2$) are overlaid on the T2-weighted image with b-value=0 s/mm$^2$ and TE=63 ms. The ADC values (1.26 µm$^2$/ms, 1.27 µm$^2$/ms, and 1.34 µm$^2$/ms) increased with TE, while the T2 values (69.41 ms, 62.03 ms, and 61.87 ms) decreased as b-value increased.

FIG. 10 shows a set of ADC maps at each TE and a set of T2* maps at each b-value obtained from the multi-readout DWI sequence, while FIG. 11 displays the corresponding ADC and T2 maps obtained from the conventional DWI sequence for comparison. Overall, the ADC values increased with TE, but the T2* or T2 values decreased with b-value. This observation was further substantiated in a group analysis on all six healthy subjects, where the mean ADC and T2* values exhibited the same trends (Table 3) as those observed on the individual subject (FIG. 10).

TABLE 3

| TE (ms) | ADC(μm²/ms)* | b-value (s/mm²) | T2*(ms) |
|---|---|---|---|
| 63.0 | 1.45 ± 0.13 | 0 | 74.78 ± 13.21 |
| 78.8 | 1.52 ± 0.14 | 500 | 63.21 ± 7.84 |
| 94.6 | 1.58 ± 0.15 | 1000 | 56.61 ± 5.05 |
| P-value | <0.01 | P value | <0.01 |

*ADC at different TEs and T2* at different b-values were compared using a Friedman rank sum test.

The ADC value averaged over all subjects increased from 1.45±0.13 μm²/ms to 1.58±0.15 μm²/ms when TE was increased from 63.0 ms to 94.6 ms, while T2* values decreased from 74.8±13.2 ms to 56.6±5.1 ms when b-value was increased from 0 s/mm² to 1000 s/mm². The Friedman test detected significant differences among the ADC values measured at different TEs (P<0.01), and among the T2* values measured at different b-values (P<0.01). The same trends were also observed in the ADC and T2 maps obtained from the conventional DWI sequence.

Figure 12:
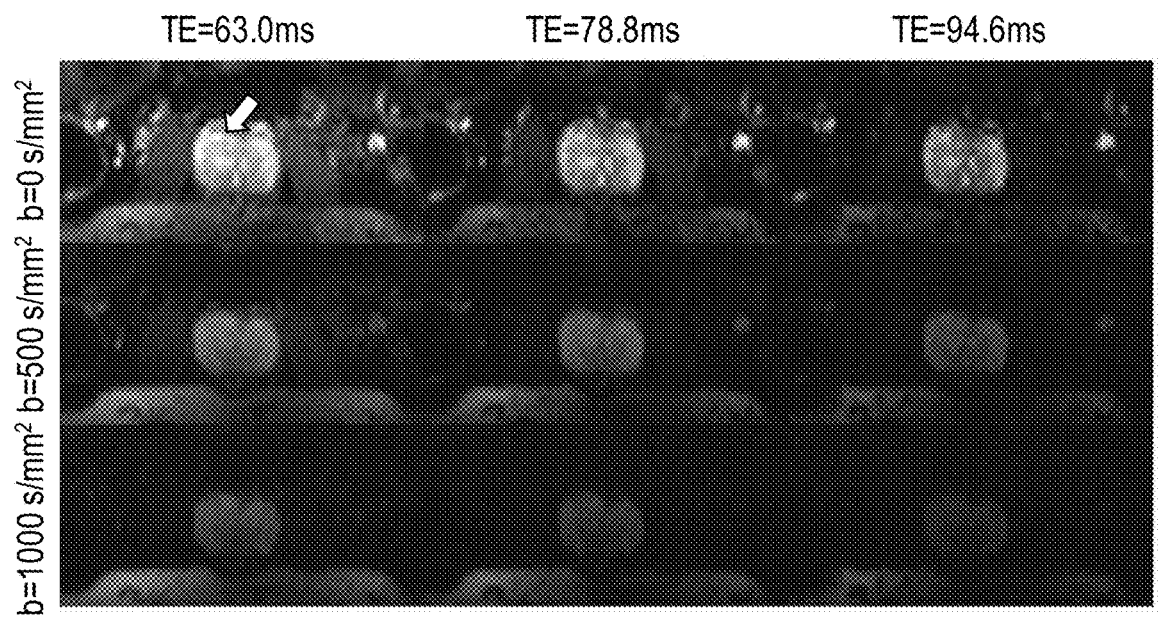
FIG. 12 shows a set of multi-readout diffusion-weighted images of the prostate with three b-values and three TEs from a patient with prostate cancer. The arrow indicates the focal region of the cancer.
Figure 13:
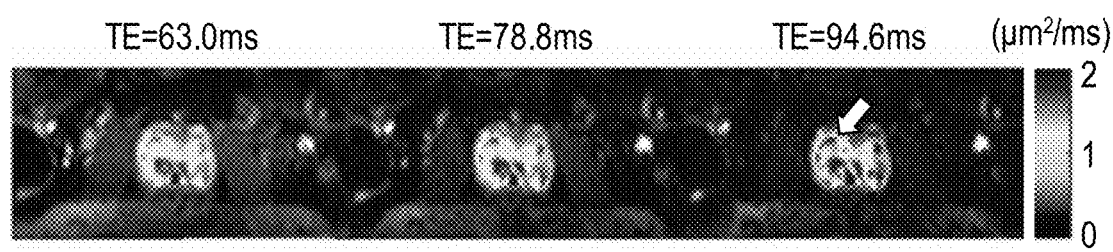
FIG. 13 shows ADC maps of the prostate at different TEs overlaid onto the corresponding T2*-weighted images (b-value of 0 s/mm$^2$) of a patient with prostate cancer, average values: 1.35, 1.39, and 1.45 µm$^2$/ms). The arrow indicates the focal region of the cancer.
Figure 14:
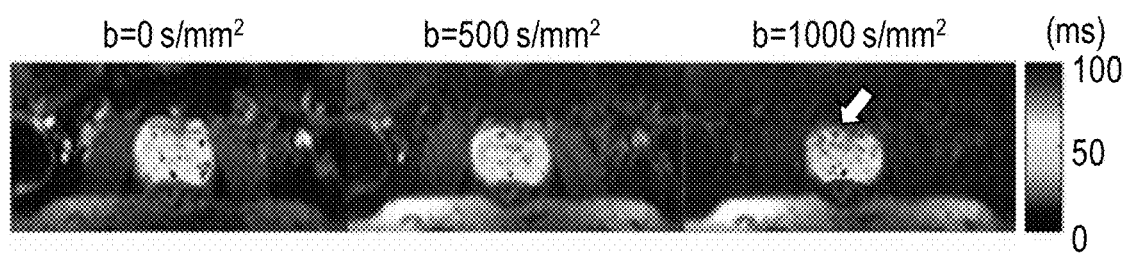
FIG. 14 shows $T_2^*$ maps of the prostate at different b-values overlaid onto the corresponding diffusion-weighted images (TE of 63 ms) of the patient with prostate cancer in FIG. 13 (bottom row; average values: 58.67, 53.85, and 50.25 ms). The arrow indicates the focal region of the cancer.

FIG. 12 displays a set of multi-dimensional diffusion-weighted prostate images, with different b-values and TEs, for a representative patient with prostate cancer. The ADC maps at each TE values for the subject are shown in FIG. 13, whereas the $T_2$* maps at each b-value are illustrated in FIG. 13. In cancerous prostate tissues, ADC increased with TEs. However, the ADC values in prostate cancer exhibited a higher degree of heterogeneity and a lower value than those in the healthy prostate gland. The data also indicated that $T_2$* values decreased as b-values increased for the prostate cancer. Additionally, prostate cancer exhibited a lower $T_2$* value.

The multi-readout DWI technique provides an alternative way to shorten the echo-train without compromising the spatial resolution by using a 2D RF pulse to limit the FOV. A set of spatially co-reregistered diffusion images across multiple TEs can be acquired in one shot, providing an efficient way to obtain DWI data in the two-dimensional parameter space defined by the b-value and TE. The multi-fold (e.g., 3-fold) improvement in time efficiency provided coupling between diffusion and relaxation times in human prostate tissues in a substantially reduced scan time (e.g., 3 min 40 sec). The observations that ADC increases with TE and T2* decreases with b-value are in good agreement with the theoretical analysis and similar studies on ADC-T2 coupling. The multi-readout DWI sequence finds use in other tissues where the coupling of ADC and relaxation times may provide useful information to aid in diagnosis.

In accordance with the present invention, inconsistent phase errors can be divided into intra-echo-train phase errors and inter-echo-train phase errors. The former has been widely studied for EPI-type of pulse sequences. Intra-echo-train phase-errors caused by a static magnetic field perturbation may lead to image shift and/or distortion, which can be mitigated by parallel imaging and/or reduced FOV excitation. The latter is more specific to the present sequence with multiple readout trains.

The shortest TE was limited by the gradient system of a clinical 3T scanner and/or the highest b-value desired. The number of b-values was limited by the total scan times. With multiple b-values across a broader range, more sophisticated non-exponential diffusion models such as NODDI, DKI, fractional order calculus model and the continuous-time random walk model may be used to provide more comprehensive diffusion-relaxation coupling information. The longer scan times associated with more b-values can be partially addressed by incorporating simultaneous multi-slice imaging into the multi-readout DWI pulse sequence to shorten the TR.

Time-Efficient Relaxation-Incorporated (TERI) Intra-Voxel Incoherent Motion Diffusion Imaging Similar to the coupling between ADC and T2* relaxation time (FIGS. 7-14), coupling between ADC and T2 relaxation time is also very important in probing tissue microstructures and analyzing diffusion MRI signals using different models. For example, the intra-voxel incoherent motion (IVIM) model has been increasingly used to investigate not only diffusion but also pseudo-perfusion parameters associated with tissue pathological changes, such as cancer. However, the conventional IVIM model has been reported to overestimate perfusion volume fraction, compromising its clinical utility. In a model known as extended T2-IVIM, compartmentalized relaxation times are incorporated to improve quantification of perfusion volume fraction, which requires acquisition of additional images at different TEs. A main challenge is that the scan time is lengthened, decreasing the efficiency while increasing vulnerability to motion. The present invention provides a sequence for time-efficient study of coupling between diffusion and T2 relaxation time. As a specific example, it offers a time-efficient, relaxation-incorporated (TERI) IVIM imaging to address the aforementioned issue with perfusion overestimation. TERI IVIM imaging uses multiple EPI readouts at different TEs in a single shot (i.e., a single excitation). The signals from TERI-IVIM may be analyzed using an extended T2-IVIM model to simultaneously characterize perfusion, diffusion, relaxation, and volume fraction.

Figure 15:
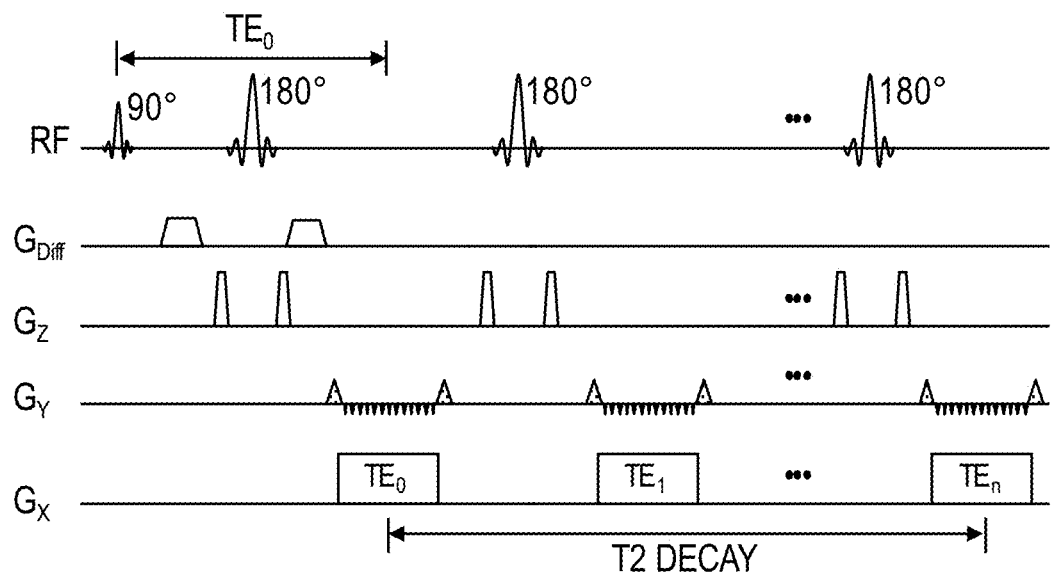
FIG. 15 is a diagram of the pulse sequence for time-efficient, relaxation-incorporated intra-voxel incoherent motion (TERI-IVIM) imaging. Multiple EPI echo-trains (or readouts) are incorporated into the sequence, with each echo-train corresponding to a distinctive effective TE ($TE_0$, $TE_1$, ..., $TE_n$). Between any two adjacent echo-trains, a 180° RF refocusing pulse is applied to refocus the signal for the subsequent echo-train acquisition. The refocusing pulses are typically accompanied by a crusher gradient pair (shaded) with varying amplitudes to eliminate unwanted stimulated echo signals. For simplicity, the slice-selection gradients on the $G_z$ axis are omitted.

Pulse sequence design. The sequence for TERI-IVIM imaging was based on a spin-echo diffusion-weighted EPI sequence in which multiple (e.g., 3) EPI readout echo-trains were placed after a Stejskal-Tanner diffusion preparation module (FIG. 15). Each EPI readout echo-train corresponded to a distinct effective TE, where the effective TE is defined as the TE when the k-space center is sampled. The first echo-train coincided with the nominal TE (TE$_0$). Following the first readout echo-train, an RF refocusing pulse was applied to refocus the signal for the second echo-train acquisition. This process was repeated until the last echo-train was acquired. Although the flip angle of the RE refocusing pulse can be 180° as shown in FIG. 15, other flip angles can also be used. To reduce the length of each echo-train without compromising the spatial resolution, thereby enabling acquisition of multiple echo-trains, GRAPPA or other parallel imaging technique can be employed.

The TERI-IVIM imaging sequence was implemented on a GE MR750 3T scanner. Using this sequence, axial brain images were acquired with a 32-channel head coil on healthy subjects. The acquisition parameters were: FOV=192×192 mm2, imaging matrix=64×64, number of slices=6, slice thickness=5 mm, slice spacing=1 mm, TR=4000 ms, TEs=50.5/80.0/109.5 ms, number of echo-trains=3, echo-train length for each train=32, b=0/20/50/100/150/200/500 s/mm2, NEX=6/6/6/6/8/10/16, and the scan time=11 min and 40 s.

Figure 16:
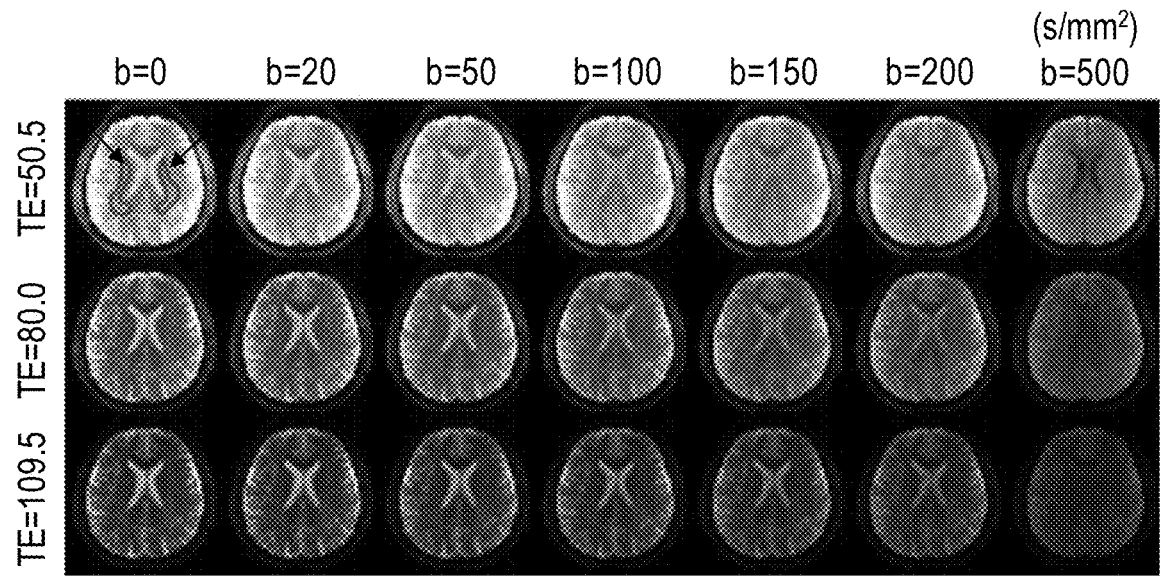
FIG. 16 shows a set of TERI-IVIM diffusion-weighted brain images with seven b-values and three TEs from a representative healthy subject (male, 26 years of age), resulting in 21 images. Regions of interest (ROI) were drawn in the white matter on the T2-weighted image (b=0 s/mm$^2$, TE=50.5 ms), as indicated by the contour lines (arrows).

Diffusion-weighted images with different b-values acquired at different TEs were separately reconstructed. The voxel-level signal in these images can be described by the following equation:

$$S(b, TE)/S_0 = f\exp(-TE/T2_p)\exp(-bD^*) + (1-f)\exp(-TE/T2_d)\exp(-bD) \quad \text{[Equation 8]}$$

where $S_0$ is the signal intensity with b-value=0 s/mm$^2$ and TE=0 ms, and $T2_p$ and $T2_d$ are the T2 values of the perfusion and true-diffusion compartments, respectively. In comparison with the conventional IVIM model, the model above can simultaneously determine compartmentalized perfusion, diffusion, and T2 relaxation parameters. The model was used to fit to all 21 images (7 b-values×3 TEs; FIG. 16) voxel-by-voxel using a non-linear least-squares fitting algorithm in MATLAB 2021a (MathWorks, Inc.). Fitting was repeated 100 times with randomized initial parameters to avoid local minima. For comparison, a conventional IVIM model was also fitted to the diffusion-weighted images acquired at TE0. Regions of interest (ROIs) were drawn only in white matter to minimize the partial-volume effects from cerebrospinal fluid (contours and arrows in FIG. 16). After obtaining the voxel-wise parameter maps, the mean value of perfusion volume fraction within the ROIs was compared between TERI-IVIM and conventional IVIM imaging.

Figure 17:
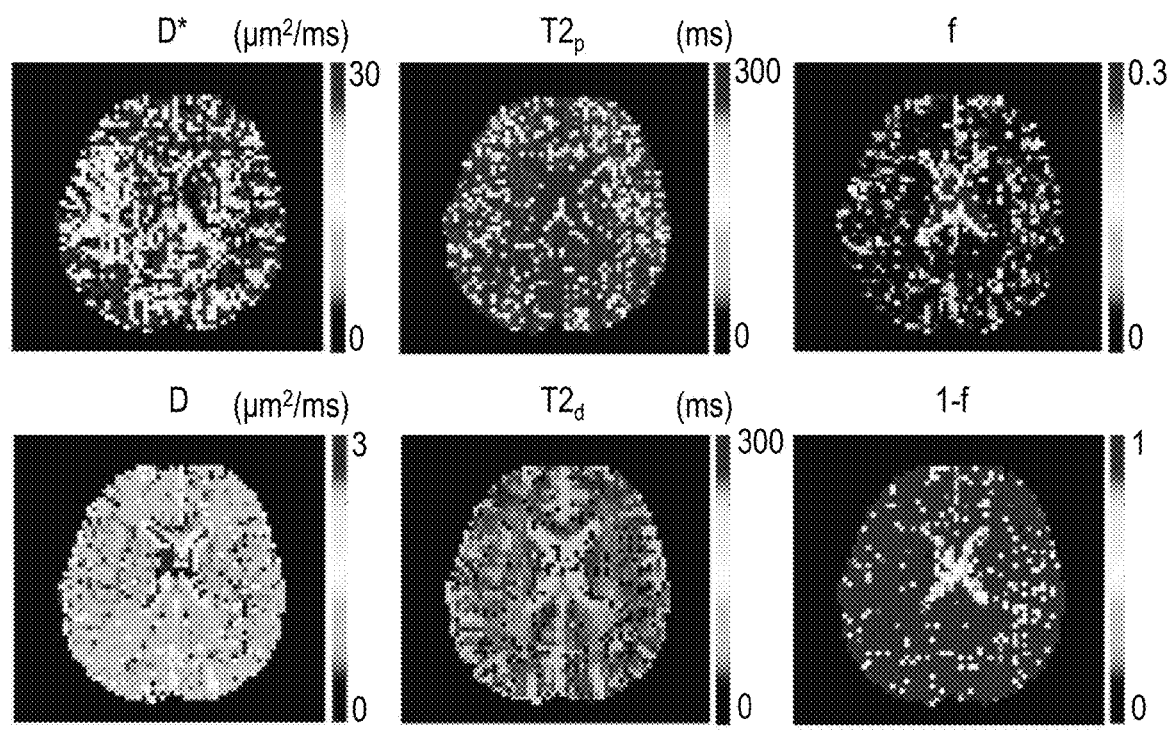
FIG. 17 shows parameter maps of D*, D, $T2_p$, $T2_d$, f, and (1−f) calculated from TERI-IVIM imaging with 21 diffusion-weighted images acquired using 7 b-values and 3 TEs.
Figure 18:
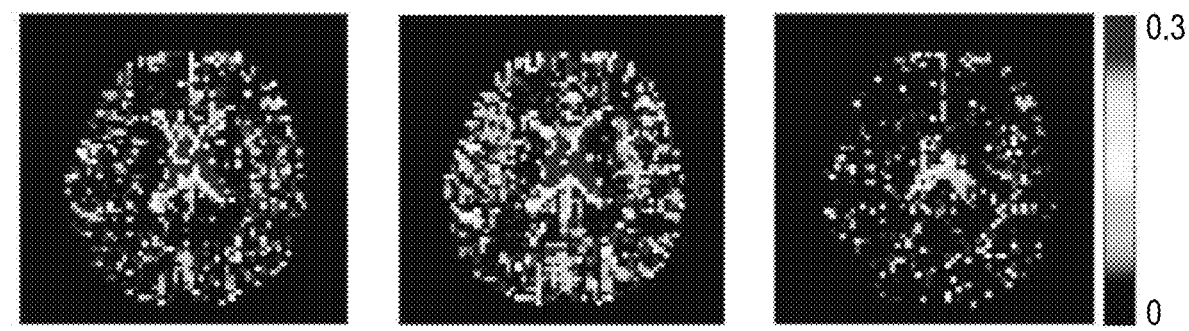
FIG. 18 shows parameter maps of perfusion volume fraction (f) calculated from TERI-IVIM imaging (left) and conventional IVIM imaging (middle). The differences of the two maps ($f_{IVIM} - f_{TERI-IVIM}$) are shown (right).

TERI-IVIM imaging enabled a three-fold acceleration without compromising the spatial resolution when compared with conventional separate scans with different TEs. Using the TERI-IVIM sequence, two-dimensional diffusion-weighted brain images (FIG. 16) from a representative healthy subject with seven b-values and three TEs were obtained within 12 minutes. TERI-IVIM imaging provided information not only on perfusion (D*) and diffusion (D), but also on compartmentalized T2 values, thereby removing the T2/TE bias in perfusion fraction quantification. Notably, the model fits the measured data well with respect to both b-value and TE ($R^2$=0.99). The resultant parameter maps are shown in FIG. 17. Quantitative measurement of perfusion volume fraction in the white matter revealed an approximately 30.4% reduction in TERI-IVIM imaging (f=0.064) compared with conventional IVIM imaging (f=0.092). The perfusion volume fraction maps of a representative slice obtained with the two techniques are shown in FIG. 18, together with their difference map.

These results demonstrate that TERI-IVIM imaging can be used to acquire multiple diffusion-weighted images at different TEs in a single shot. The three-fold improvement in time efficiency enables quantification of perfusion, diffusion, relaxation, and volume fraction in the human brain in less than 12 minutes. TERI-IVIM produces a lower perfusion volume fraction than conventional IVIM imaging thereby reducing overestimation.

Multi-Echo Diffusion-Weighted Imaging for Quantifying Luminal Water Fraction

The present invention also provides multi-echo diffusion-weighted imaging (DWI) in conjunction with a two-compartment model to differentiate between lumen and non-lumen tissues.

Figure 19:
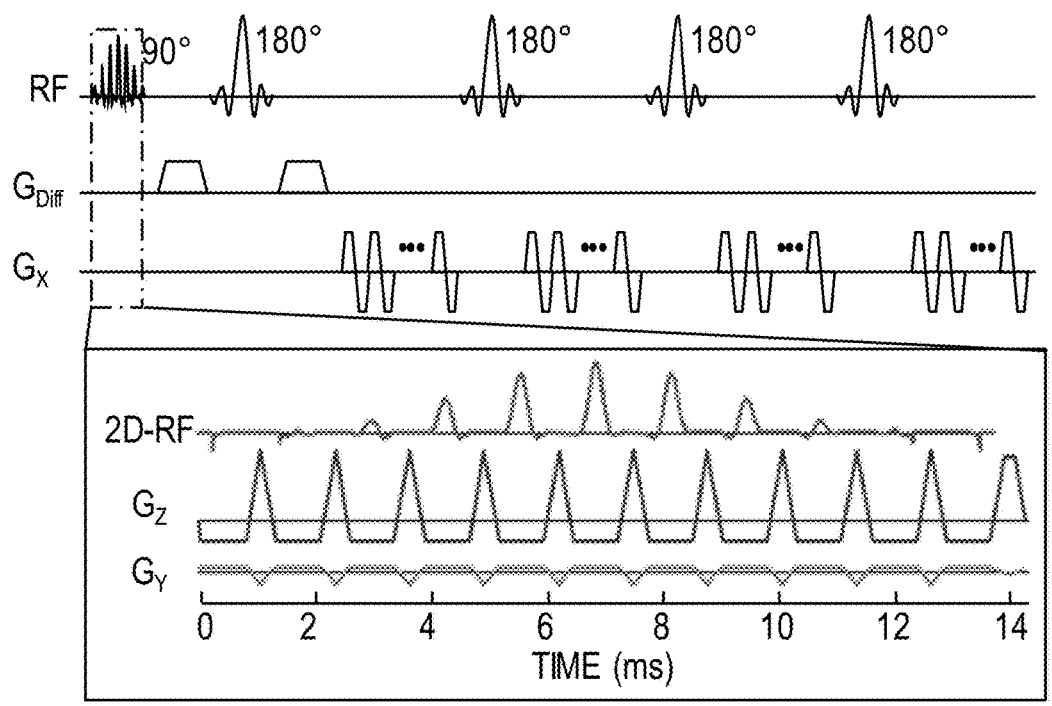
FIG. 19 is a diagram of the multi-echo DWI pulse sequence for use in quantifying luminal water fraction. Multiple EPI echo-trains (or readout trains) are incorporated into the sequence, each following a 180° refocusing pulse and with a specific effective TE. A 2D RF excitation pulse is employed to restrict the FOV and shorten the echo train length, enabling multiple echo-trains to be acquired.

Multi-echo DWI sequence design. Unlike the conventional diffusion-weighted spin-echo EPI sequence, the multi-echo DWI sequence incorporated multiple (e.g., 4) EPI readout echo-trains after a Stejskal-Tanner diffusion preparation module (FIG. 19). Each EPI readout echo-train corresponded to a distinct effective TE. The first echo-train coincided with the nominal TE ($TE_0$). The subsequent echo-trains were acquired following each RF refocusing pulse. Although the flip angle of the RE refocusing pulses can be 180° as shown in FIG. 19, other flip angles can also be used. To reduce the length of each individual echo-train without compromising the spatial resolution, the FOV was restricted to the prostate by using a 2D RF pulse, enabling fewer phase-encoding steps (i.e., shorter echo-train length). The 2D RF pulse was designed by employing a fly-back EPI-like excitation k-space trajectory. Eleven sub-pulses with a time-bandwidth product (TBP) of 3.01 were modulated by an envelope pulse whose TBP was 3.53 and pulse width was 14.7 ms. A tilted excitation k-space strategy was employed to enable multi-slice imaging.

Two-compartment model. It has been reported that lumen has longer T2 and higher ADC than the other compartments in the prostate. The corresponding MRI signal can be described by the following equation:

$$S(b, TE)/S_0 = f\exp(-TE/T2_l)\exp(-b \times ADC_l) + (1-f)\exp(-TE/T2_{nl})\exp(-b \times ADC_{nl}), \quad \text{[Equation 9]}$$

where $S_0$ is the signal intensity with b-value=0 s/mm$^2$ and TE=0 ms, f is the volume fraction of lumen, and the subscripts l and nl indicate the luminal and non-luminal compartments, respectively, for T2 or ADC.

The multi-echo DWI sequence was implemented on a GE MR750 3T scanner. To demonstrate the technique, axial prostate MRI scans were performed using a 32-channel cardiac coil on healthy volunteers with the following parameters: FOV=180×90 mm$^2$, imaging matrix 64×32, reconstruction matrix=128×64, number of slices=12, slice thickness=4 mm, slice spacing=0.5 mm, TR=4000 ms, number of echo-trains=4, TEs=58/88/118/148 ms, b-values$_{NEX}$=0$_4$/250$_6$/500$_{10}$/750$_{15}$/1000$_{20}$ s/mm$^2$, NEX represents the number of averages, and the scan time=11 min and 4 s.

Diffusion-weighted images acquired at different TEs were individually reconstructed. The two-compartment model fitting was performed on the set of 20 images (5 b-values×4 TEs) using a non-linear least-squares fitting algorithm in MATLAB 2021a (MathWorks, Inc.). To avoid local minima, the fitting was repeated 100 times with randomized initial parameters. Regions of interest (ROIs) were drawn in the peripheral zone (PZ) by avoiding the partial-volume effects from urethra (FIG. 20).

Figure 20:
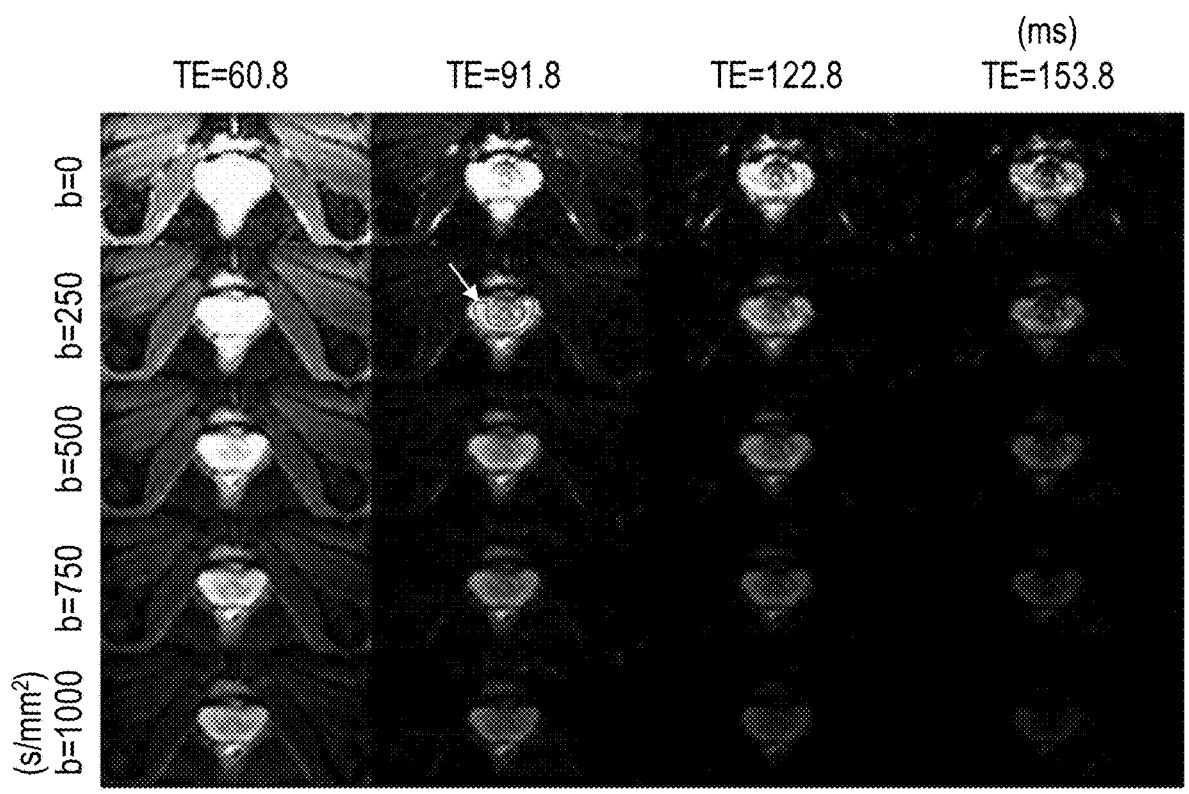
FIG. 20 shows a set of multi-echo diffusion-weighted images of the prostate with five b-values and four TEs from a 35-year-old healthy male subject, resulting in twenty images as shown. A region of interest (ROI; contour line indicated with arrow) was drawn on the diffusion-weighted image with b=250 s/mm$^2$ and TE=91.8 ms.
Figure 21:
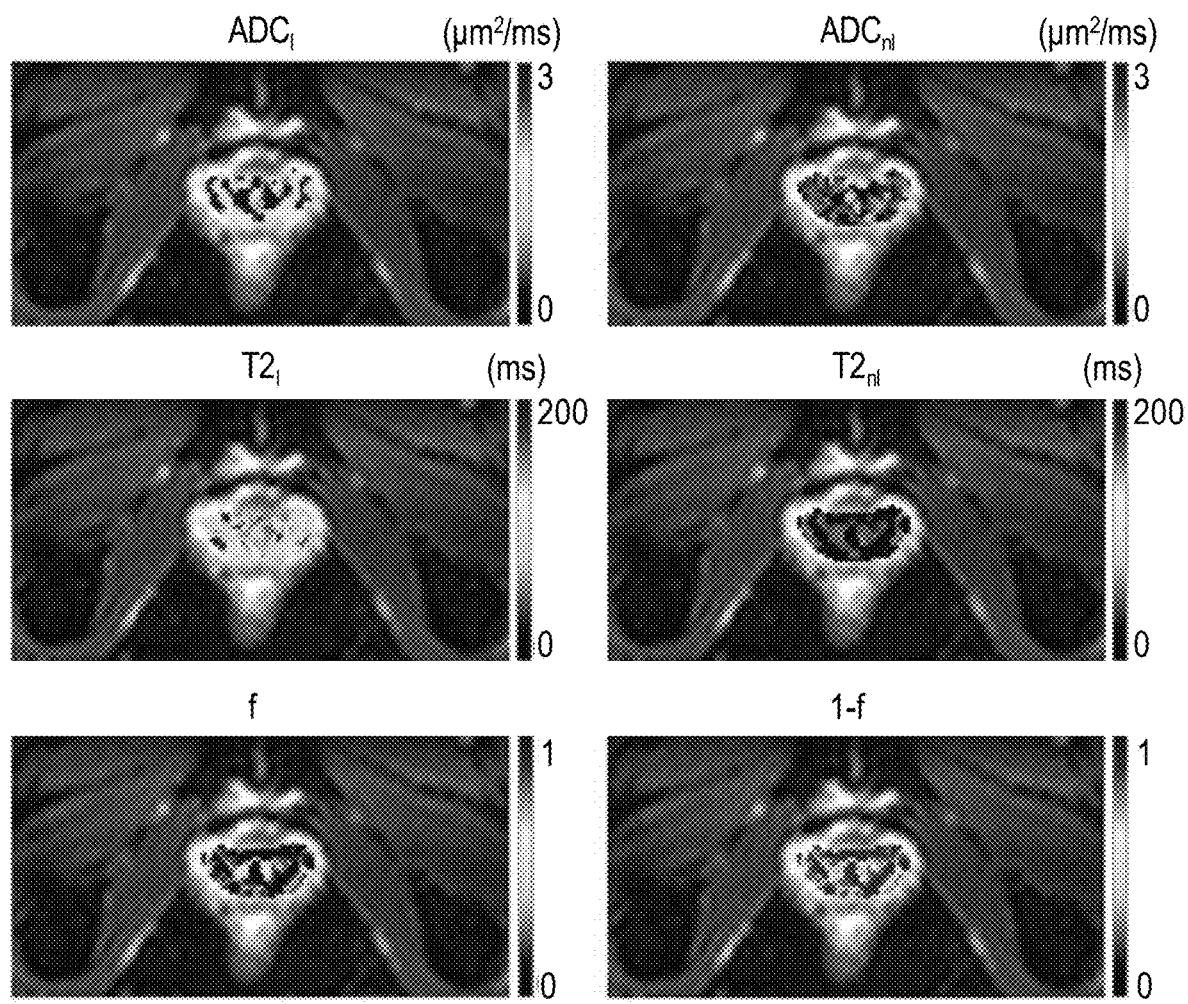
FIG. 21 shows a set of representative parameter maps of $ADC_l$, $ADC_{nl}$, $T2_l$, $T2_{nl}$, f, and (1−f) calculated from the multi-compartment model using the 20 diffusion-weighted images acquired with 5 b-values and 4 TEs.

FIG. 20 displays a set of two-dimensional diffusion-weighted and T2-weighted prostate images from a 35-year-old representative healthy male subject, with five b-values in one dimension (vertical) and four TEs in the other dimension (horizontal). Parameter maps estimated using the two-compartment diffusion model were shown in FIG. 21. ADC, T2, and volume fraction were demonstrated for lumen and non-lumen tissues, respectively. Quantitative measurement of luminal water fraction revealed a value of approximately 24% in the PZ. Notably, the two-compartment diffusion model fits the measured image intensities very well, with an RSE (relative squared error) <0.01.

Using the present multi-echo DWI sequence, a set of spatially co-reregistered images across multiple b-values and TEs were produced, enabling two-compartmental analysis that accounted for both diffusion and T2 relaxation effects in the prostate. This approach produced volume fraction of lumen and non-lumen tissues that were in general agreement with the literature results obtained with techniques requiring a much longer scan time. These results demonstrate that the multi-echo DWI sequence and its associated compartmentalized analysis are of use in the characterization of prostate cancer and other cancerous tissues.

What is claimed is:

1. A magnetic resonance image (MRI) capture method comprising the steps of:
    generating a single pulse sequence to produce a plurality of image contrasts, the plurality of image contrasts comprising at least a first contrast coupled with a second contrast;
    acquiring the plurality of image contrasts, wherein the plurality of image contrasts correspond to diffusion-weighted each images, diffusion-weighted image being acquired with a train of gradient echoes consistent with echo-planar imaging and at a specific effective echo time ($TE_{eff}$), wherein the $TE_{eff}$ is defined as the echo time (TE) when k-space center is sampled, and wherein each gradient-echo train comprises a shortened train of echoes to produce an image over a reduced field-of-view; and
    capturing and producing an image.

2. The MRI capture method of claim 1, wherein the plurality of image contrasts is used for simultaneous parametric mapping of apparent diffusion coefficient, T1 relaxation time, T2* relaxation time, and/or T2 relaxation time.

3. The MRI capture method of claim 1, wherein a gradient blip pulse is applied along a phase-encoding direction between adjacent echo trains to re-position the start point of the k-space trajectory for a next echo-train acquisition.

4. The MRI capture method of claim 1, wherein each gradient-echo train comprises a shortened train of echoes by employing parallel imaging, sparse k-space sampling, segmented k-space acquisition or a combination thereof.

5. The MRI capture method of claim 1, wherein the plurality of image contrasts is used in an intra-voxel incoherent motion (IVIM) diffusion model and extensions thereof.

6. The MRI capture method of claim 1, wherein the plurality of image contrasts is used to study coupling between diffusion and relaxation times in materials or biological tissues, thereby inferring material or tissue microstructures.

7. The MRI capture method of claim 1, wherein the first contrast is a diffusion-weighted contrast and the second contrast is a contrast weighted by spin-spin relaxation time (T2).

8. The MRI capture method of claim 7, wherein a plurality of TE or TEeff are generated by a train of radiofrequency (RF) refocusing pulses, each RF refocusing pulse producing a spin echo from which the train of gradient echoes are acquired.

9. The MRI capture method of claim 1, wherein the first contrast is a diffusion-weighted contrast and the second contrast is an apparent spin-spin relaxation time-weighted contrast (T2*-weighted contrast).

10. The MRI capture method of claim 9, wherein a plurality of TE or TEeff are produced by a plurality of trains of gradient echoes.

11. The MRI capture method of claim 10, wherein the plurality of trains of gradient echoes is acquired at, about, or immediately after the formation of a stimulated echo.

12. The MRI capture method of claim 10, wherein the plurality of trains of gradient echoes are acquired at, about, or immediately after the formation of a spin echo.

13. A magnetic resonance imaging (MRI) system comprising:
    an MRI scanner comprising image contrast data acquisition coils configured to produce a plurality of image contrasts over a reduced field-of-view, the plurality of image contrasts comprising a first contrast coupled with a second contrast; and
    an image processing component operably connected to the MRI scanner and configured to receive and process the plurality of image contrasts from the image contrast data acquisition coils to produce an image.

14. The system of claim 13 wherein the image is produced by the method of claim 1.

* * * * *